Feb. 3, 1959
D. B. DOOLITTLE
2,872,132
AIRCRAFT LAUNCHING SYSTEM
Filed Dec. 17, 1954
11 Sheets-Sheet 1
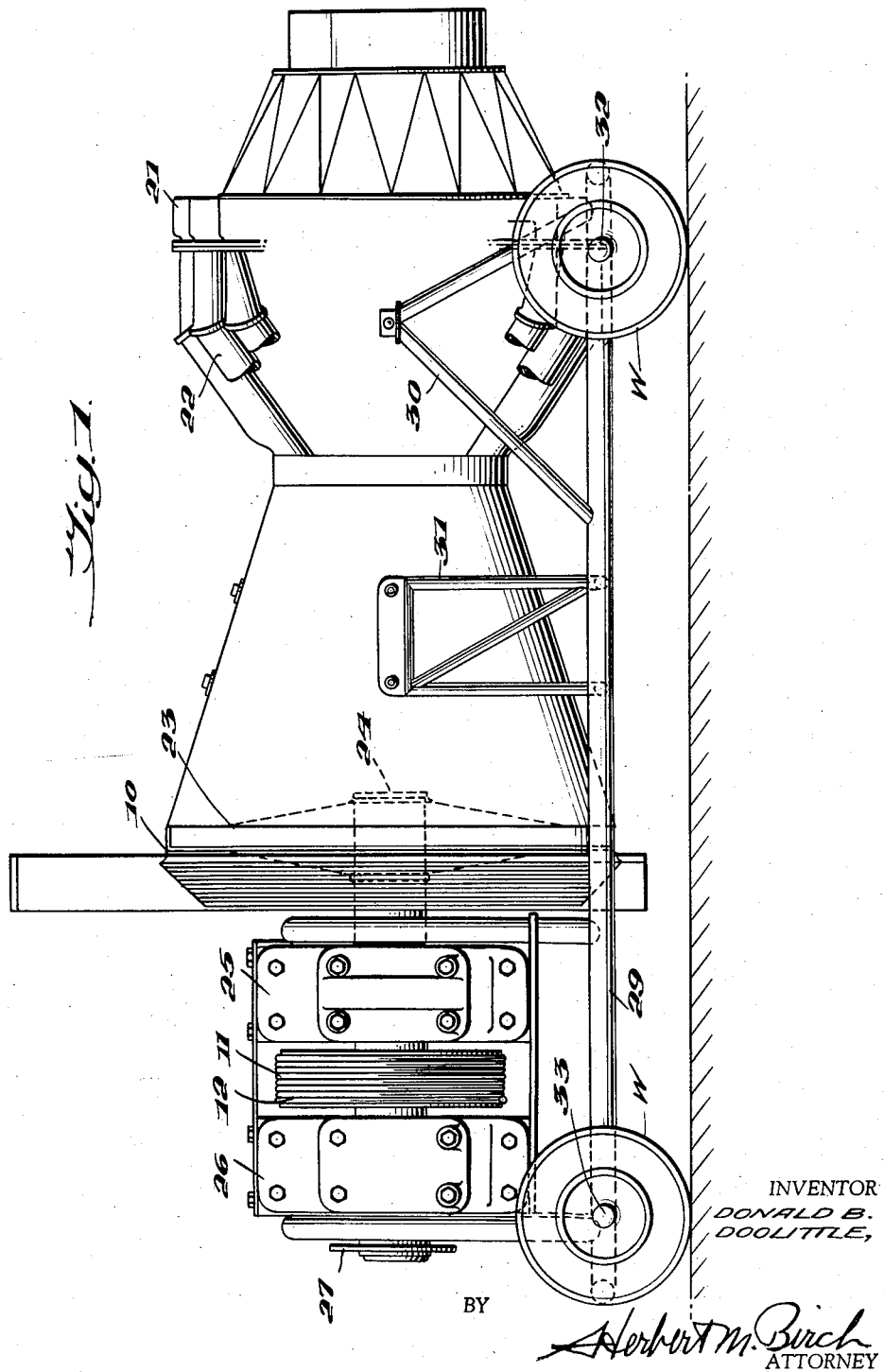
INVENTOR
DONALD B.
DOOLITTLE,
BY
Herbert M. Birch
ATTORNEY

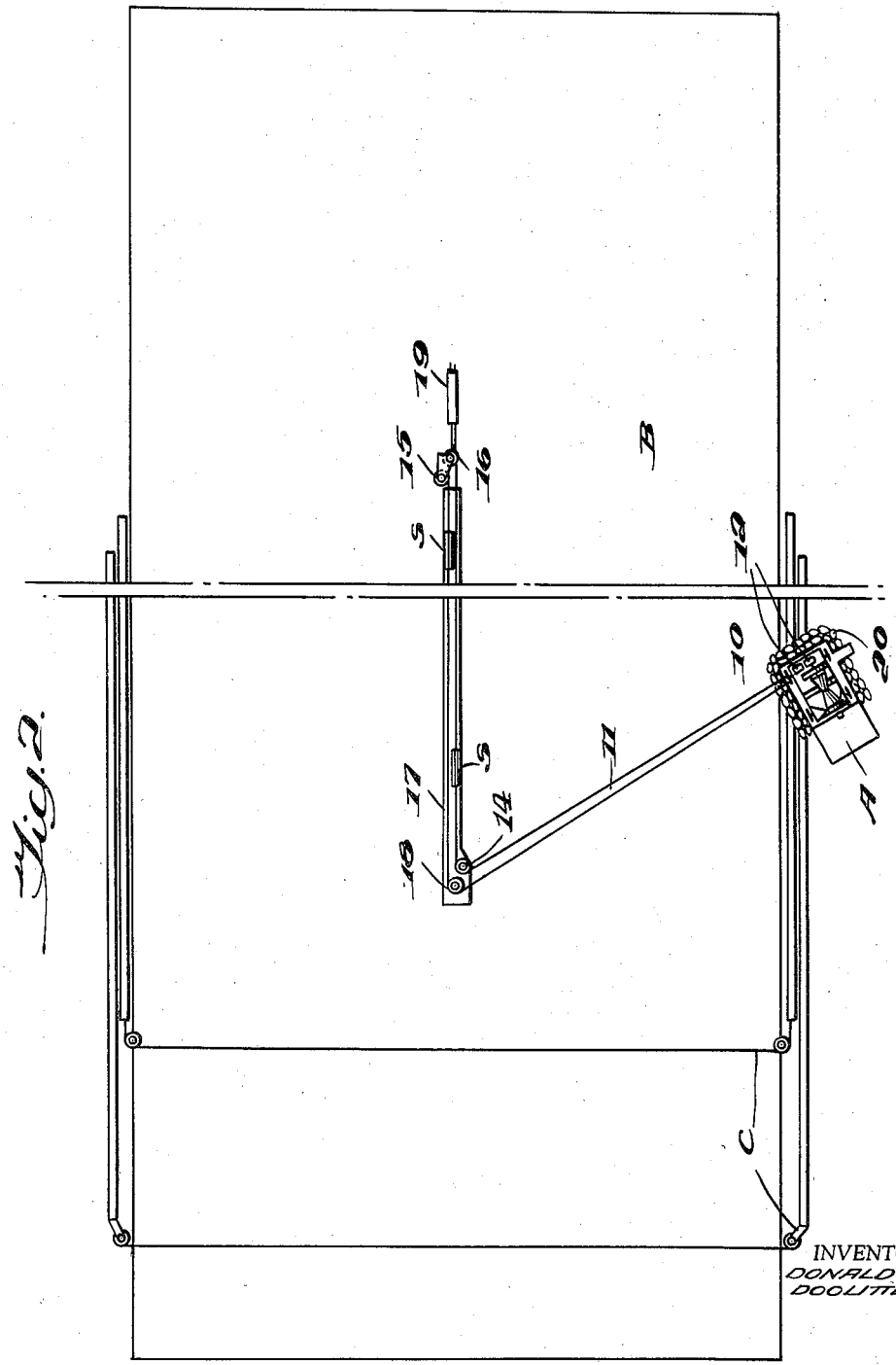

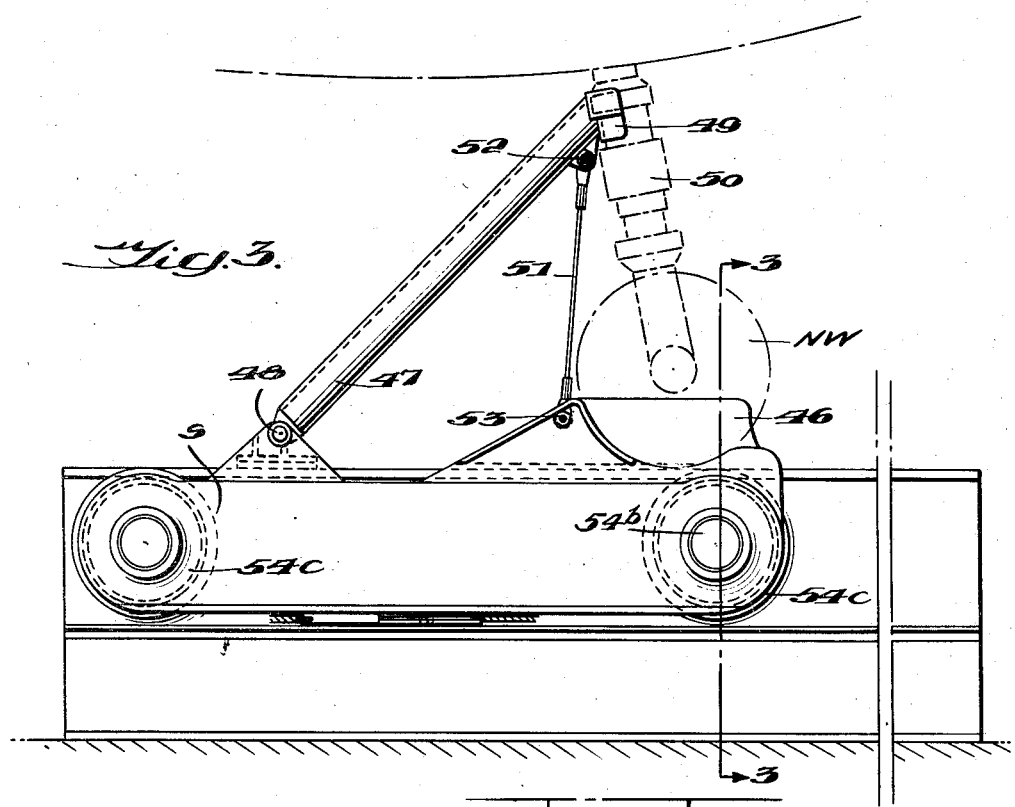
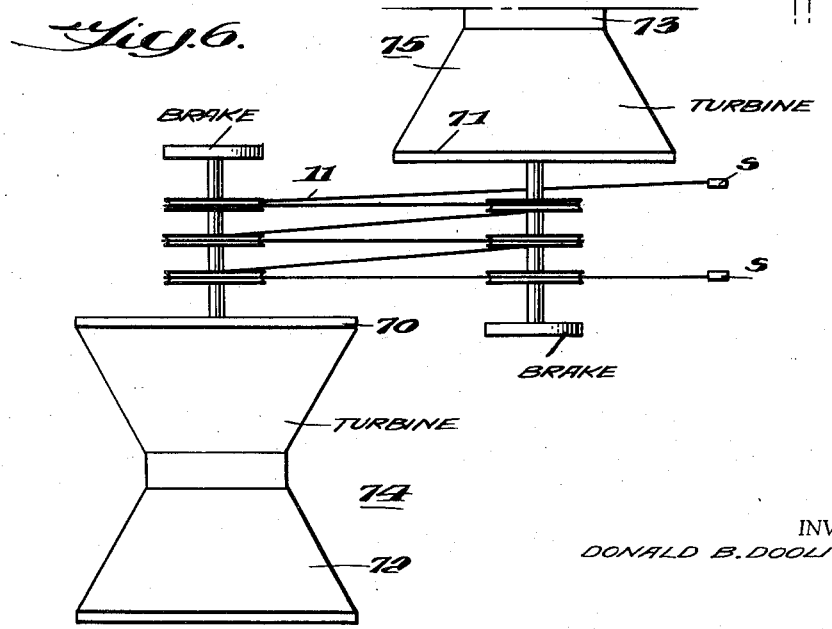

Feb. 3, 1959  D. B. DOOLITTLE  2,872,132
AIRCRAFT LAUNCHING SYSTEM
Filed Dec. 17, 1954  11 Sheets-Sheet 4
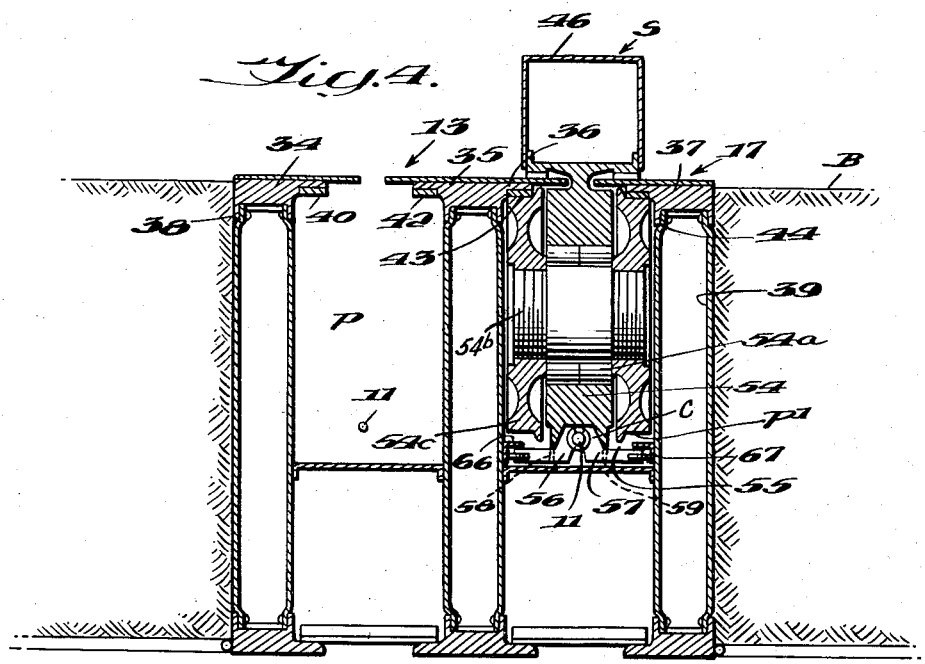
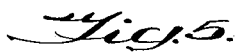
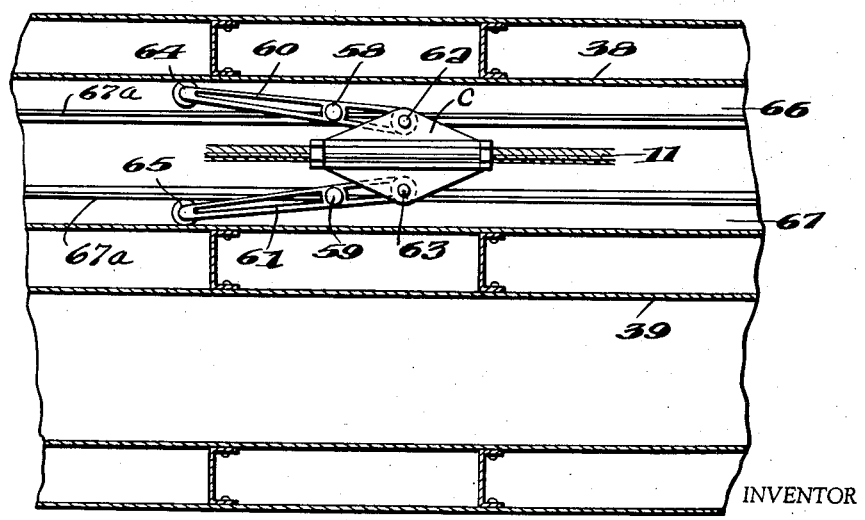
INVENTOR
DONALD B. DOOLITTLE,
BY Herbert M. Birch
ATTORNEY

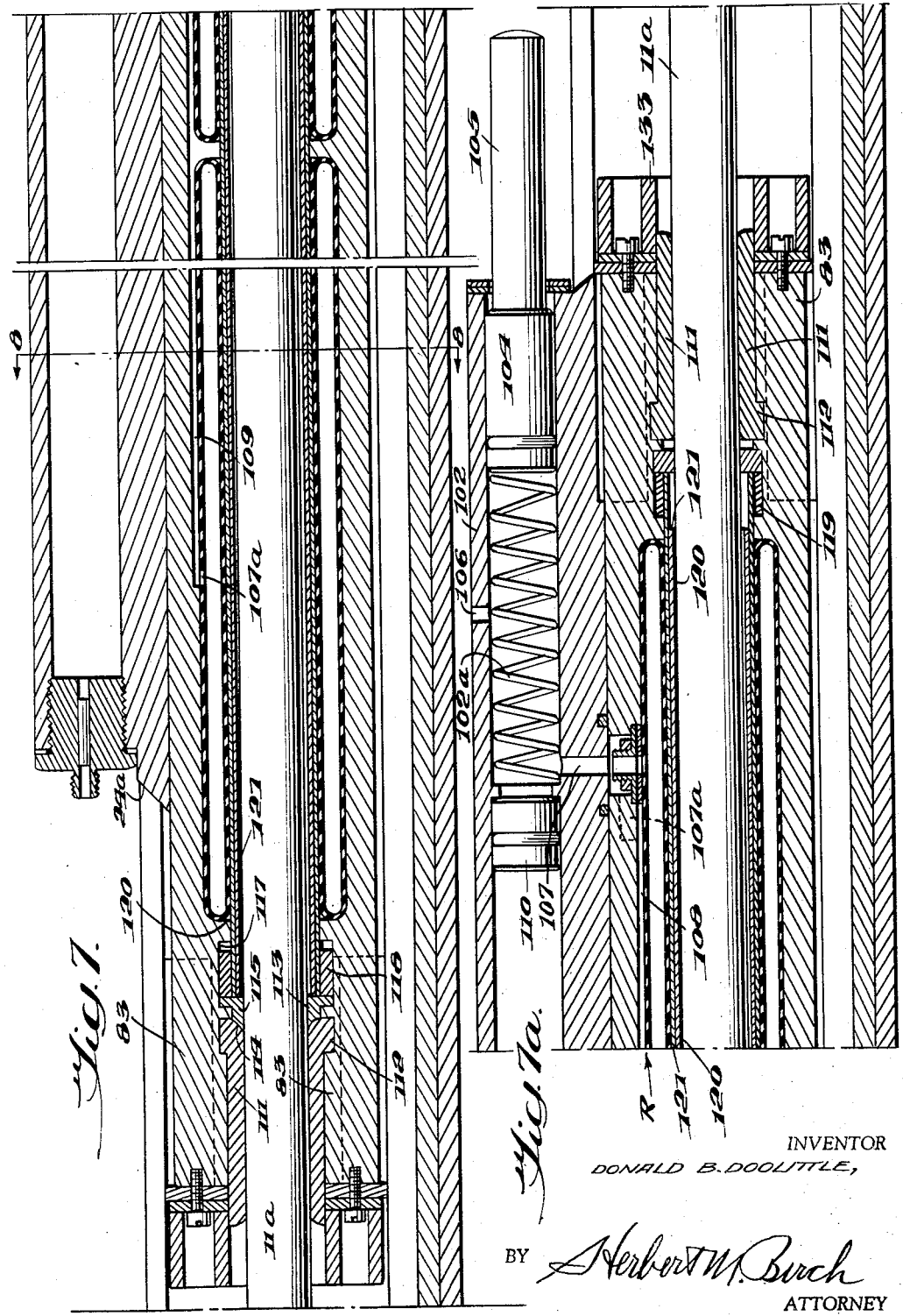

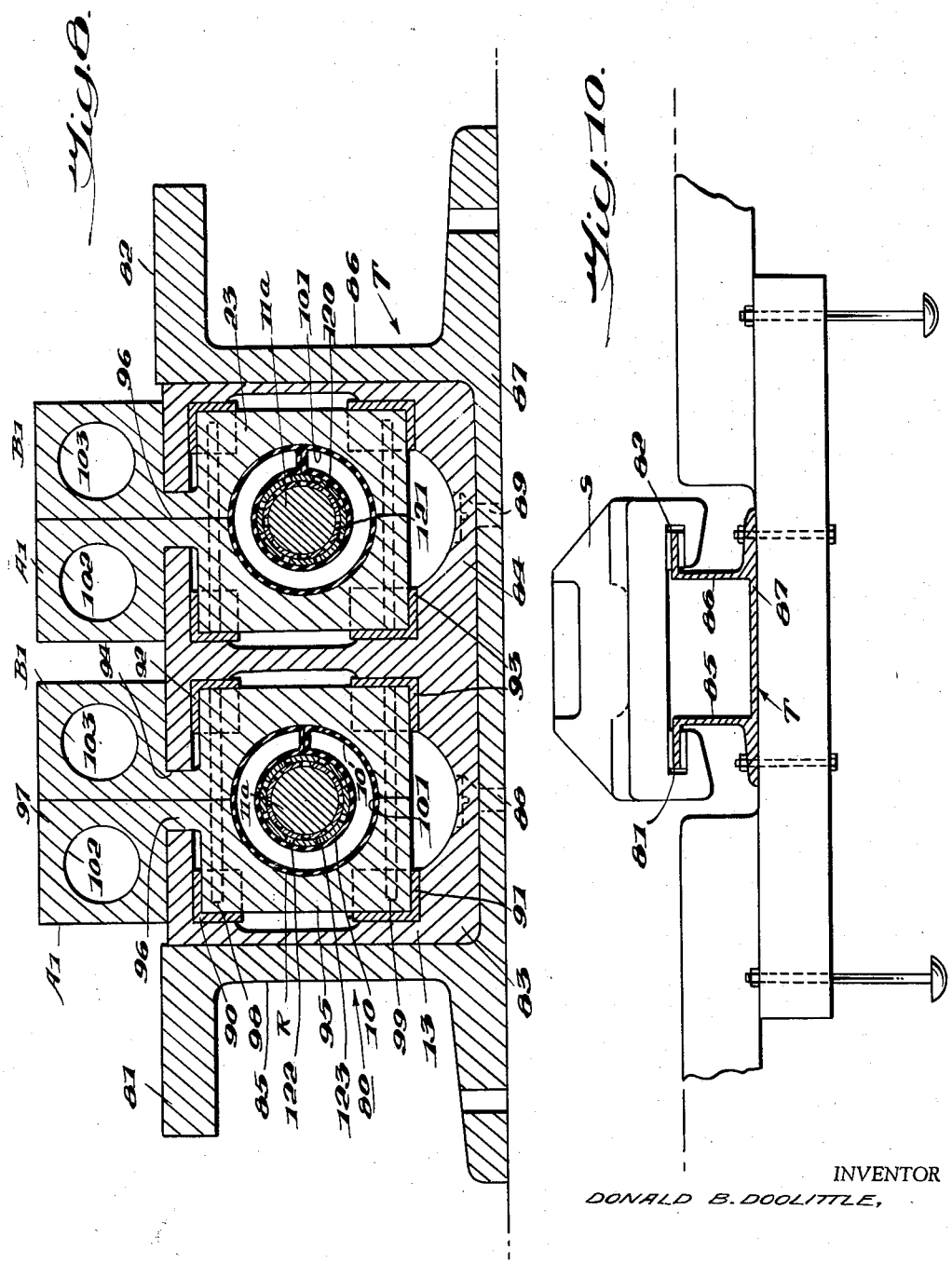

Feb. 3, 1959

D. B. DOOLITTLE 2,872,132

AIRCRAFT LAUNCHING SYSTEM

Filed Dec. 17, 1954

INVENTOR
DONALD B. DOOLITTLE,

BY Herbert M Birch
ATTORNEY

Feb. 3, 1959 D. B. DOOLITTLE 2,872,132
AIRCRAFT LAUNCHING SYSTEM
Filed Dec. 17, 1954 11 Sheets-Sheet 8
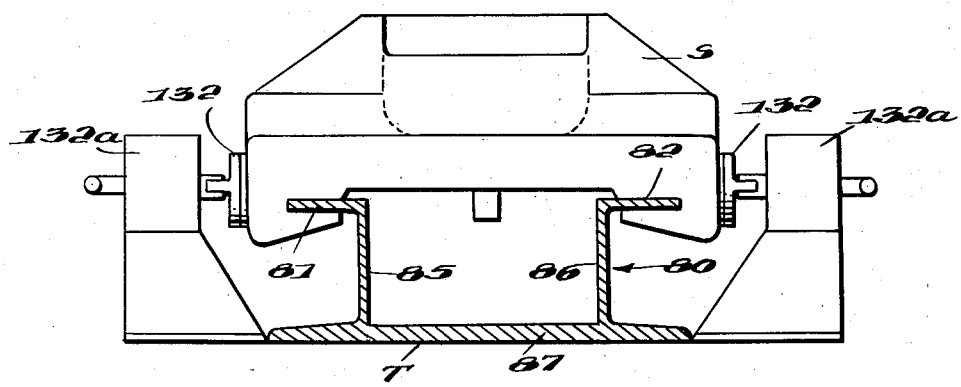
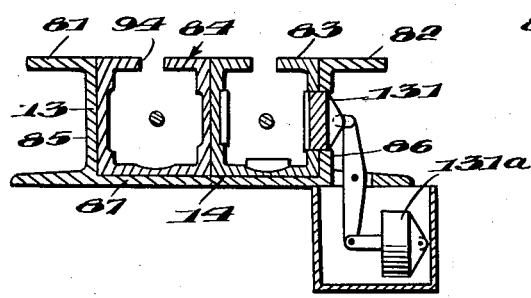
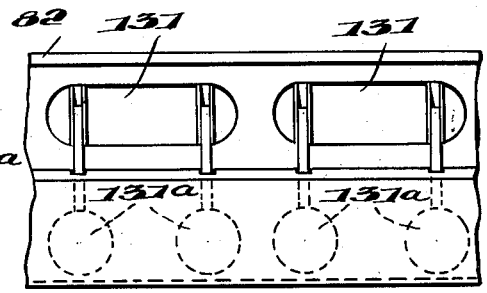
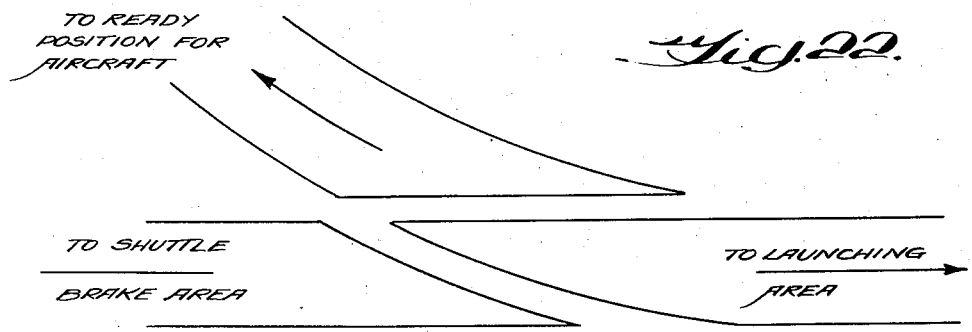
INVENTOR
DONALD B. DOOLITTLE,
BY
ATTORNEY

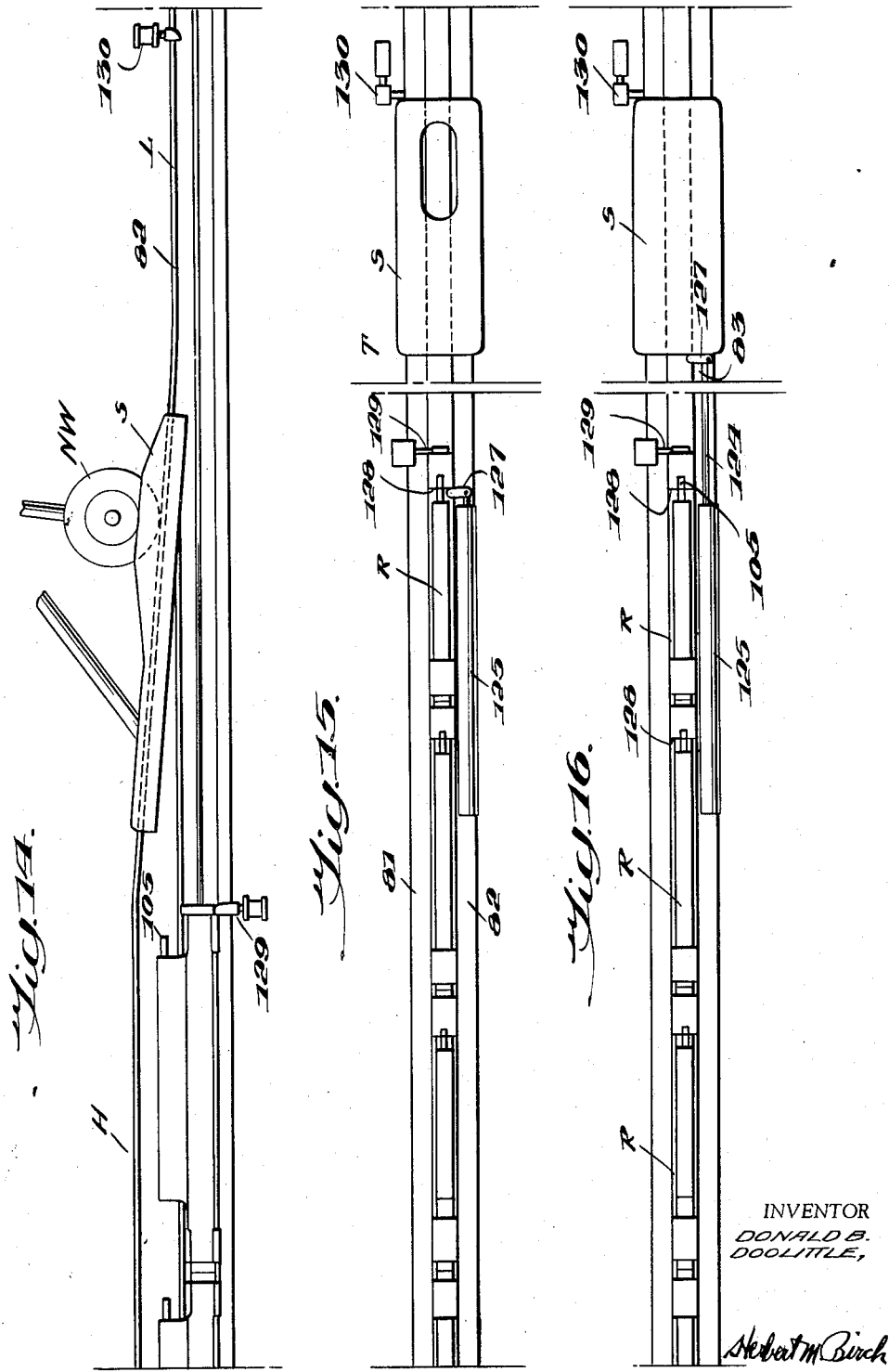

Feb. 3, 1959   D. B. DOOLITTLE   2,872,132
AIRCRAFT LAUNCHING SYSTEM
Filed Dec. 17, 1954   11 Sheets-Sheet 10
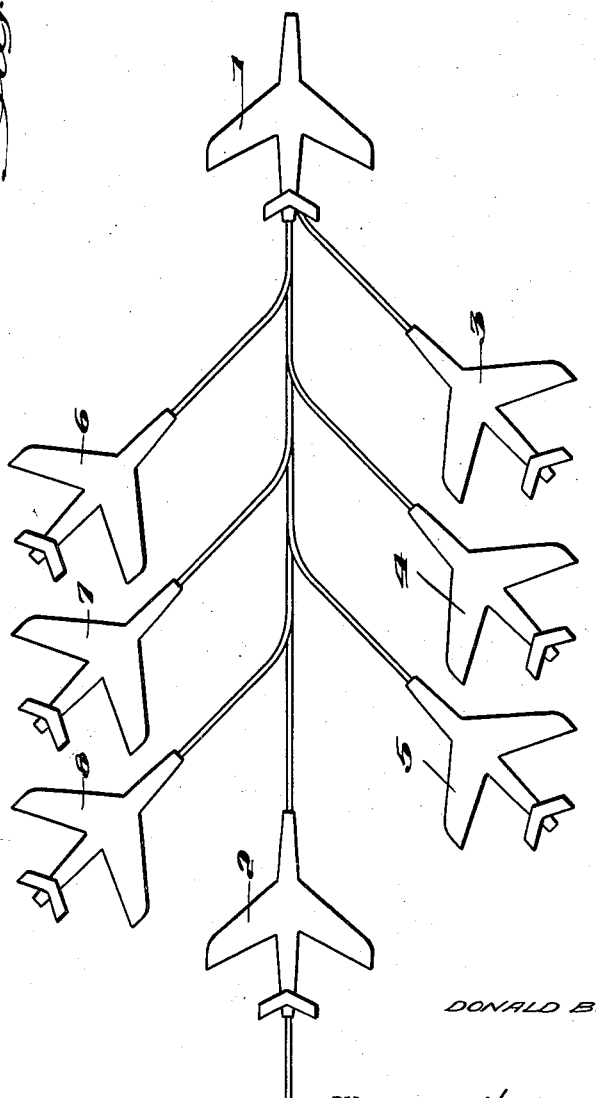
INVENTOR
DONALD B. DOOLITTLE,
BY
Herbert M. Birch
ATTORNEY Feb. 3, 1959 D. B. DOOLITTLE 2,872,132
AIRCRAFT LAUNCHING SYSTEM
Filed Dec. 17, 1954 11 Sheets-Sheet 11
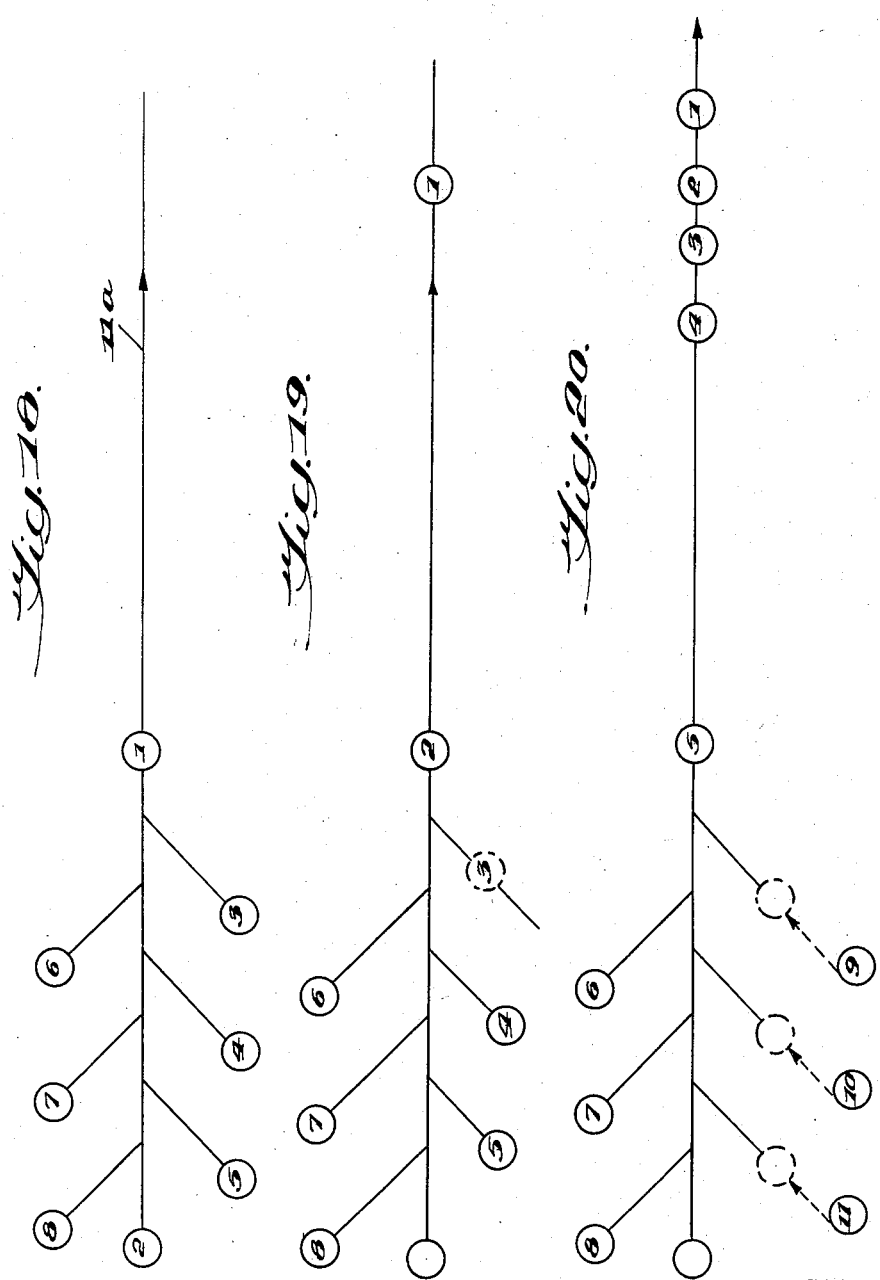
INVENTOR
DONALD B. DOOLITTLE,
BY *Herbert M. Birch*
ATTORNEY United States Patent Office 2,872,132
Patented Feb. 3, 1959

2,872,132

AIRCRAFT LAUNCHING SYSTEM

Donald B. Doolittle, Wilmington, Del., assignor to All American Engineering Company, Du Pont Airport, Wilmington, Del., a corporation of Delaware Application December 17, 1954, Serial No. 475,978

11 Claims. (Cl. 244—63)

The present invention relates generally to an aircraft launching system and more particularly to such a system utilizing one or more jet powered turbines, a launching cable or the like and an aircraft shuttle means.

An object of this invention is to provide a jet powered aircraft launching system which is reliable, economical and light-weight.

Another object is to provide a portable turbo-jet engine as a source of power. For example, heretofore most catapult launching developments were not satisfactory because the source of power used was extremely heavy or dangerous to handle, or involved difficult clutch heating problems. Accordingly, in addition to the above objects, it is another object to provide an engine requiring no clutch. For example, the jet engine is actually the equivalent of an air clutch and essentially a constant thrust engine.

A further object is to provide a novel launching cable and shuttle arrangement detachably connectable for operative use and adapted to be powered by a jet engine system in combination with a brake device for R. P. M. build up of engine power for launching action.

Still another object is to provide a novel cable clamp and a novel progressive launching system for a plurality of aircraft.

With these and other objects in view, the invention consists in the construction, arrangement and combination of parts hereinafter described and particularly summarized in the appended claims, it being expressly understood that there is no intent to limit this invention to the present disclosed details of construction.

In the drawings, like parts throughout the several views are given like numerals and thereby identified in the following detailed description:

Figure 1 is a view in elevation of one form of turbo-jet engine with a jet impact turbine mounted on a portable carriage.

Figure 2 is a top plan view of a diagrammatic nature illustrating the turbo-jet engine in operative connection with the launching catapult cable and shuttle means;

Figure 3 is a view in side elevation of a portion of an aircraft undercarriage and the novel shuttle structure and track for the same;

Figure 4 is a transverse section view taken on section line 3—3 through the shuttle, catapult cable and a dual shuttle track;

Figure 5 is a longitudinal section view illustrating one form of a shuttle cable clamp mechanism for each shuttle used;

Figure 6 is a side view in elevation of a pair of jet driven turbines adapted to provide for multiple launching in reverse or opposite directions.

Figures 7 and 7a are longitudinal cross section views of another form of cable clamp mechanism and operating means therefor;

Figure 8 is a transverse cross section view taken on the section line 8—8 of Figure 7, also disclosing the shuttle track but wherein the piston is omitted;

Figure 10 is a cross section view taken on the section line 10—10 of Figure 9;

Figure 9:
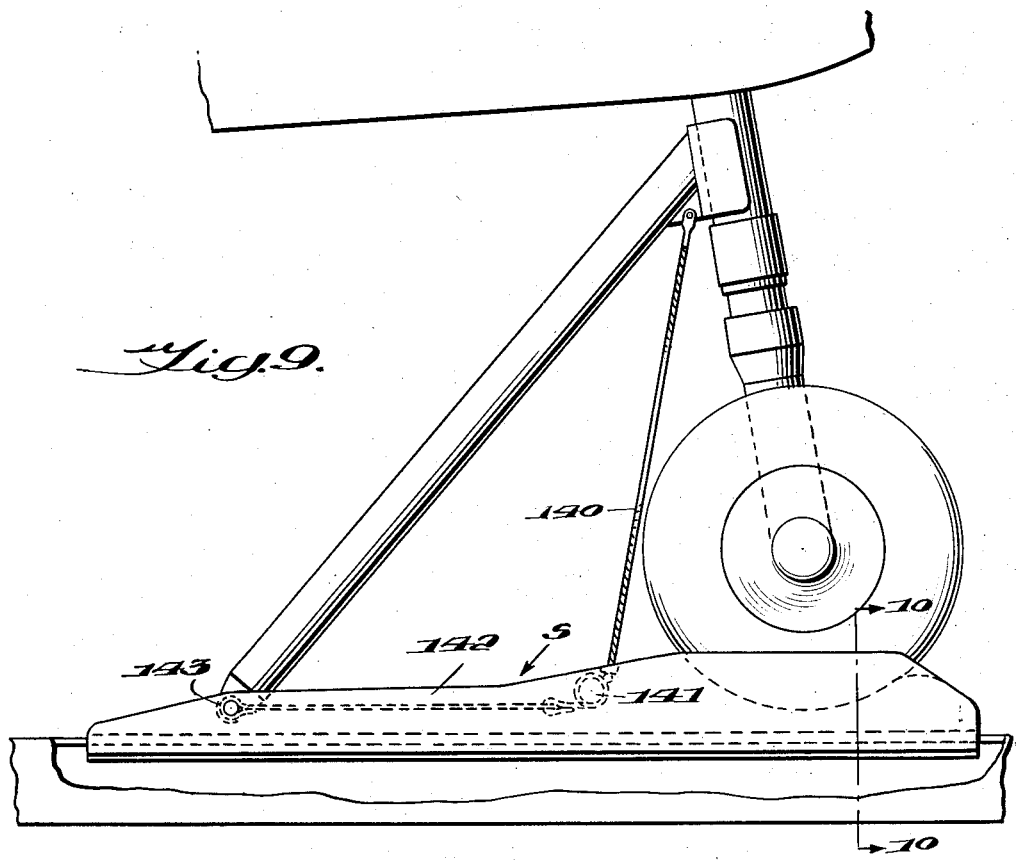
Figure 9 is a side elevation view of a modified nose wheel shuttle.
Figure 21:
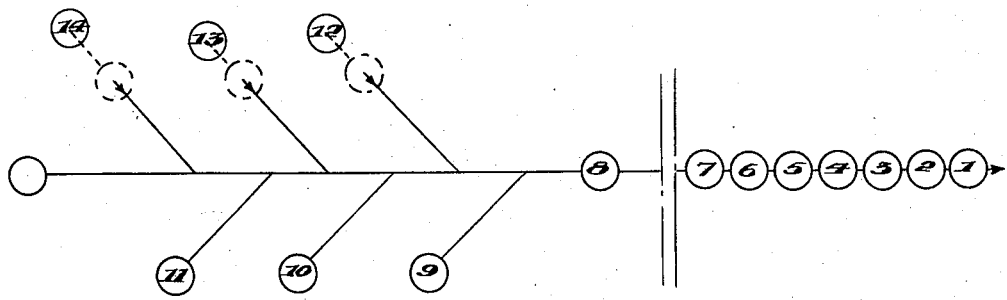

Figure 11 discloses the shuttle device and the brake means therefor;

Figure 12 is a transverse section view taken on a transverse section line of Figure 7 disclosing the cable clamp brake means for the clamp housing means;

Figure 13 is a side elevation of a portion of Fig. 12;

Figure 14 is a side elevation of the shuttle track disclosing the elevated section of the shuttle track for underpassing the cable clamp with respect to the shuttle at the track launching ends;

Figure 15 is a top plan view of the nose wheel shuttle, cable clamps and trackway disclosed in Figure 14;

Figure 16 is a side view in elevation of the elements disclosed in Figure 14;

Figure 17 is a diagrammatic illustration of a novel launching system wherein the novel cable clamps, nose wheel shuttle and control brakes and latches therefor are utilized;

Figures 18, 19, 20 and 21 illustrate the progressive launching of as many as eight aircraft, wherein replacement cable clamps and shuttle members for each aircraft launched are consecutively positioned from the several side switch tracks to the launching section of the main track section; and Figure 22 is a top plan view of one of the track switch sections.

Referring in detail to the drawings and first with particular reference to Figure 2, there is illustrated diagrammatically a complete system consisting of a catapult assembly A, operatively associated with a runway B for launching aircraft, and may also be equipped with an arresting gear assembly C for landing aircraft, such arresting gear being disclosed in copending application, Serial No. 436,281, assigned to the present assignee and now abandoned. The catapult mechanism and launching system is the sole subject of this application and comprises a turbo-jet engine 10 (see also Figure 1), a launching cable 11 reeved around power take-off drive pulleys or sheaves 12, an idler sheave 14, see Figure 2, and thence forward below a shuttle track 13 around a tension sheave 16 connected to a tension cylinder 19 and thence under a jockey sheave 15 rearward below a second shuttle track 17 (see Figure 4), in spaced longitudinal relation around a second idler sheave 18 back to the drive sheaves 12 in an endless loop. When the turbo-jet engine is rolled into proper position, it may be made solid and secure by the proper barricade 20.

The jet engine and turbine structure is shown in Figure 1 and includes the usual ring manifold 21 and control valves not shown from which lead-off a series of exhaust ducts 22. These ducts exhaust adjacent the blades of a turbine 23 keyed to drive shaft 24 journalled in longitudinally spaced apart bearing housings or pillows 25 and 26. On the shaft 24 between each bearing housing is keyed the sheave 12 around which is looped the drive end of the launching cable 11.

The turbine shaft 24 extends beyond the bearing housing 26 and has mounted thereon a brake mechanism of any suitable type, such as the friction brake 27, with suitable operating means, not shown. The complete turbine unit and jet engine is made mobile by mounting the same on a dolly comprising a chassis 29 with side brace means 30 and 31, respectively, to the jet engine and to the exhaust duct and turbine casing, and transverse axle means 32 and 33 at the front and rear of the chassis for rotatably mounting pairs of ground wheels W.

The catapult mechanism includes a dual track system, namely tracks 13 and 17, countersunk in the runway B (see Figure 4). The catapult cable 11 extends through elongated pits P and P' below the level of each track. The first track 13 is formed of guide rails 34 and 35 and the second track 17 is formed of guide rails 36 and 37. Each of the respective pairs of guide rails are supported on a frame structure 38 and 39, respectively mounted in each respective pit. The top of each frame is formed with inwardly facing flanges 40 and 42 and 43 and 44, respectively.

The launching carriage or shuttle construction S is disclosed in Figures 3, 4 and 5 and comprises a structure above the guide rails of the track means, said structure comprising a wheel cradle 46 for at least one wheel, such as the nose wheel NW of an aircraft and a brace 47 pivotally secured to a center lug 48 on the shuttle extending upward between the rails. The brace 47 on its free end includes a half cylindrical plate 49 adapted to seat against the aircraft landing strut 50 and if desired it may be held in place by a tie rod 51 connected between the free end of the brace and a part of the wheel cradle 46 by means, such as bolts 52 and 53. The shuttle body below the guide rails of the track structure comprises a solid axle bearing block 54 formed with a longitudinal groove 55 at the bottom in which are mounted the opposed tapered half sections or jaw members 56 and 57 of a cable gripping device or clamp 58. Each jaw member 56 and 57 is secured to the block 54 on each side the groove 55 by pins 58 and 59 and activator arms 60 and 61 pivotally connected to each respective jaw member by pins 62 and 63, respectively. Journalled in the block 54 in bearing race 54a is an axle 54b with spaced inwardly flanged track wheels 54c.

The free ends of the activator arms 60 and 61 of the shuttles each have journalled thereon a roller 64 and 65 (see Figure 5). Arms 60 and 61 have their respective pivotal connections 62 and 63 to the jaw members 56 and 57 and 58 and 59 to the bearing block 54, so proportioned and spaced as to cause the free ends with the rollers 64 and 65 thereon to diverge outwardly into engagement with the side walls of their respective frames 38 and 39 and between longitudinally spaced guide flanges 66 and 67 (see Figures 4 and 5). These guide flanges together with ribs 67a in uniformly spaced relation to the side walls of frames 38 and 39 retain the activator arms in a position at the head of the launching track spread apart so as to grip or clamp the launching cable 11. However, near the terminus of each track the walls of the frame structure in the pit are reduced in their respective spaced apart relation as are the ribs 67a, whereby the activator arms are thereby forced closer together to release the jaw members of the shuttle being utilized from the cable 11.

With the dual track arrangement each of the spaced walls of each frame in each pit P and P' have their respective reduced wall spaced terminii portions at opposite ends, to thereby provide for dual launching in reverse directions and for accommodating a similar shuttle construction and operation on each track.

Figure 6 is another form of the invention disclosing a multiple launching engine having oppositely rotatable turbines 70 and 71. A first turbine 70 for driving the cable 11 in one direction and a second turbine 71 for driving the cable 11 in the opposite direction to complete a second launching with a second shuttle. The first and second shuttle arrangement is shown diagrammatically in Figure 1 using only one engine. However, Figure 6 discloses two jet engines, namely 72 and 73, which are duplicates of the engine disclosed in detail in Figure 1.

The mounting for the dual engine launching mechanism is formed in sections. For example, section 74 mounts turbo-jet 70—72 and section 75 mounts turbo-jet system 71—73. These sections are preferably adjustable to accommodate different installation requirements.

*Operation and advantages*

Briefly, in the operation of the turbine powered catapult of this invention, the turbine or each turbine in the case of Figure 6, is braked by means of the turbine brake in the stalled condition while the engine is brought up to R. P. M. Then when the turbine brake is released the torque of the turbine transmits the load to the cable system 11, which accelerates the airplane connected to the shuttle by the cable clamp. The shuttle of course when in the retracted or starting position must have cable clamp jaw means clamped around the cable. When the shuttle has moved along the track to a location, for example, 100 feet from the end of the catapult run or if a predetermined speed is reached, the turbine brake may be applied either manually or automatically and the cable system 11 is stopped. It is to be understood that any suitable power means may be provided for applying the turbine brake, that is, either fluid or electrical. Also, at a predetermined location synonymous to the brake application the shuttle clamp jaws are released by the closer spacing between the frames 38 and 39, which force the activator arms closer together to release the plier-like action of the clamp.

As shown in Figure 6, by using a shuttle and cable clamp for each reach or span of cable reciprocal launching can be used with no change to the equipment itself.

Another embodiment of the invention relating to novel cable clamp mechanism R for pushing the nose wheel shuttle S to terminal position from launching position is illustrated in Figures 7 through 13.

This form of cable clamp is used in a novel plural launching system, which comprises a plurality of shuttle switch tracks, namely seven, each with an aircraft 2, 3, 4, 5, 6, 7 and 8, alternately switched off from the main straight launching track section on which is the number 1 aircraft to be launched, see Figures 14 through 22. Each switch track is straddled by the respective aircraft to be launched, which respective aircraft progressively taxi from each respective switch track in position for launching over launch cable 11a of the main straight launching track section.

Each aircraft of each respective switch track is brought into launching position with its nose wheel on a shuttle S riding down a ramp from the high to the low level of the main track sections H and L, respectively, see Figure 14. The cable 11a reeves around sheaves as in Figure 2, at each end of the straight shuttle track T, see Figures 8 and 11.

The shuttle track T comprises a U-shaped body 80 with spaced apart guide rails 81 and 82. The body houses a pair of cable clamp guides or housing 83 and 84, which seat firmly between the sides 85 and 86 of the track T on the base 87 thereof and are secured to the base by bolts 88 and 89. These cable clamp guides are closed elongated rectangular housings with elongated angle bars or slide blocks 90, 91, 92 and 93 at each corner thereof and an elongated guide slot 94 at the top thereof.

Fluid actuated clamp means R comprising a rectangular block 95 having a neck portion 96 integrally connecting said block 95 with a rectangular head section or shuttle drive block 97 are mounted in each cable clamp guide 83 and 84, respectively. Each block including the neck 96 and head portion 97 thereof is formed in half sections A' and B' held together by suitable members, such as bolts 98 and 99. The sections of each of the lower block portions when clamped together form an elongated bore 101. The cable 11a extends centrally through this bore 101 in both lower blocks in the housings 83 and 84, one section of the cable 11a travelling forward for providing launching energy, while the return or reverse section of the cable 11a may be used for cable clamp and shuttle retrieving or for reciprocal launching by the reverse cable section.

The half sections A' and B', respectively, of the head or drive block portion 97 are each formed with elongated longitudinal bores or cylinders 102 and 103. In these bores or cylinders are mounted the cable clamp actuating means comprising a reciprocating piston 104 with an extension 105 for engaging with the tail end of the launching shuttle S. This piston 104 reciprocates in the cylindrical bore 102 against the resistance of a spring 102a. The cylinder is connected to a suitable fluid source by a conduit 106, preferably hydraulic. From the cylinder 102 a feed conduit 107 and by-pass 107a lead into tandem arranged conduit connected expander pads rolled in the form of tubes 108 and 109, respectively, which may be inflated or expanded when extension 105 is retracted by the weight of the shuttle S and the piston 104 is thereby forced rearwardly in the cylinder bore 102. This piston movement is resisted by an air loaded piston 110, which maintains a constant pressure in the cylinder and feed line 107. Each cable clamp normally is free of the cable 11a and to reduce any frictional resistance with the cable when the clamp is idle the clamp at each end mounts a split guide, namely, a hardened steel bushing 111, see Figure 7. These split bushings each embrace and encircle the cable.

Each split bushing or guide 111 is formed with a shoulder 112, which fits in an annular groove 113 formed in the interior wall of the clamp guides or housings 83 and 84, respectively. The rim 114 of the shoulder 112 is rounded and conforms to the annular rim of a packing ring 115 having an annular flange 116. The exterior flange surface of the packing ring 115 laps into a second relatively larger annular groove 117 formed in the clamp housing interior wall. This second groove 117 receives the coupling rings 118 and 119, respectively, of the expander tubes 108 and 109 at each end of a clamp housing.

A duplicate pair of tandem connected expander pads or tubes similar to 108 and 109 are mounted around the return section of cable 11a in housing 84. These tubes will become clamped to the return section of cable when a reversely directed piston rod extension of the clamp operating means in the head block 95 of housing 84 contacts the tail of a shuttle S headed in the reverse direction. The clamp actuator means for the reverse direction clamps operates in the same manner as described in connection with the forward launching direction.

The expander tubes 108 and 109 are shielded from direct contact with the cable 11a by a pair of longitudinally split concentric slotted cable conformable inner and outer tubes 120 and 121, preferably made of metal, held in position in clamp block base 95 by the coupling rings 118 and 119. These coupling rings are relatively less in width than the width of the groove 117 to permit longitudinal movement during the clamping action imparted from an expander tube to its respective adjacent part of the conformable cable clamp slotted tubes. The slotted tubes 120 and 121 have flexible walls, because of their respective alternately spaced slots 122 and 123, and therefore when one of the expander tubes 108 or 109 is expanded, the walls of the slotted metal tubes 120 and 121 are compressed inwardly and conformably clamp the cable 11a. When this compressed clamping action occurs the clamp moves forward as a part of the cable, and the piston rod extension 105 engages the tail end of the nose wheel shuttle S, thereby pushing the same forward over the low level track guide rails 81 and 82.

A battery of cable clamps to be used are stored in a housing below the high level track section H and are pushed forward to launching position one at a time by a fluid actuated thrust rod 124, a fluid cylinder 125 and piston 126 actuating the rod 124 into engagement with a shuttle moved down the ramp to the lower section track L. This rod 124 carries on its free end a one-way acting dog or latch 127 pivoted to the end thereof. This latch 127 rigidly engages with a shoulder 128 on the cable clamp R with a ratchet action through an elongated slot not shown in the side walls of the track and clamp housing guides 83 and 84, until retracted to pick-up the next clamp. The length of the piston rod 124 is calibrated in length to thereby cause the cable clamp to be pushed forward into engagement with the tail of the shuttle S, while a second latch 129 holds the next clamp to be used in position for subsequent use, see Figures 15 and 16.

The shuttle S in launching position is held against a third shock mounted latch or stop 130. This latch may be remotely controlled either electrically or by fluid pressure. Thus, when the shuttle S is in launching position and a cable clamp is projected forwardly against the shuttle tail end the turbine speed is brought up to a predetermined speed, while the turbine brakes are applied, and then the hydraulic means of the cable clamp is actuated to expand the forward drive expansion tube 108. Then when the turbine brakes are released the jet power is imparted to the cable 11a and the clamp propels the shuttle S with the aircraft and shuttle along the track for launching. As the shuttle nears the terminal end of the track T on the guide rails 81 and 82 the clamp carrier housing 83 is stopped by linear friction brakes 131 controlled by fluid cylinders 131a, see Figure 12, within approximately twenty feet, whereby the cable clamp piston rod projection 105 is disengaged from the tail end of the shuttle S and the piston 104 returns to its inactive position. This releases the pressure within the expanded tube 108 and the shuttle is stopped by brakes 132 controlled by fluid cylinders 132a, see Figure 11. At each end of the clamp housing is a buffer 133 which may strike a stop, not shown, at the terminal end of the track. As shown in Figure 9, the shuttle S may have a resilient check rein or cable 140 reeved around a sheave 141 to a resilient line 142 secured to the pivot block 143 on the top of shuttle.

*Operation and system method of second clamp embodiment*

The system of plural or series launching of aircraft as for example fifteen second intervals as illustrated in Figures 18–22, is as follows:

Aircraft number 1 is diagrammatically illustrated in position ready for launching on the shuttle. A corresponding number 1 cable clamp is forced against the tail end of the shuttle and is thus securely clamped to the cable by fluid pressure to the expander tubes. The engines on the turbine are run up to the required power while the turbine brakes are applied and when the required power is reached the brakes are released thus starting acceleration of the launching cable and shuttle with its respective aircraft number 1. When the desired velocity is attained the turbine brakes are applied to stop the turbines and the cable, thus separating the cable clamp and the shuttle. Upon separation from the shuttle the cable clamp automatically releases from the cable because of the release of the fluid pressure to the expander tube and the cable clamp carrier housing is stopped by a linear friction brake operated by fluid, for example, air pressure, supplied by an operator controller valve, not shown. After the cable clamp is stopped within approximately twenty feet the clamp brake is released and the clamp is pushed by suitable means to the far end of the track T out of the way of the next clamp.

The shuttle that carried the nose wheel of the aircraft launched travels freely, until the shuttle brake area is reached, where it is arrested within approximately fifty feet by friction brake shoes acting upon the sides of the shuttle. These brakes are likewise fluid pressure operated. After the shuttle is stopped the brakes are released and the shuttle is moved by suitable means beyond the brake area.

As soon as the first aircraft is on its way, aircraft number 2 starts to taxi into position. Upon reaching the cable clamp area, the height of the guide rails increases permitting the shuttle to ride over and clear the driving block and piston rod extension of the clamp assembly and it is then drawn into launching position. The aircraft has twelve seconds, for example, to reach launching position. As soon as the cable stops moving from the first launching, the next or second clamp is forced against the next or second shuttle, thereby coupling the shuttle to the cable as in the first launching operation. Aircraft number 2 is now ready for launching.

This cycle may be repeated for as many aircraft as there are clamps at the launching end of the cable.

When all of the cable clamps have been used, the entire group of clamps may be towed by a jeep or similar vehicle back to the starting position. The shuttles may be taken from the far end of the track and returned by truck as necessary or set up for a reverse launching. After the cable clamps have been retrieved, another similar group of aircraft may be launched at predetermined intervals, for example, every fifteen seconds.

Preferably the ratio of the cable driving sheaves to the turbine diameter is such that catapult accelerating load will be two times the load ordinarily developed by the engine when used in an aircraft.

There are many basic advantages of the present catapult, such for example, as follows:

1. *Fuel availability.*—The fuel for a catapult of this type would not be a logistic problem since it would already be available at the site for use of the aircraft to be launched, which utilizes the same fuel;

2. *Economy.*—By using the jet engine as a source of power, the benefit of the research conducted in the jet engine field is gained. Also, semi-obsolete engines can be used.

3. *Maintenance and logistic support requirements.*—Personnel used to service the jet powered aircraft would have no difficulty in servicing the catapult because the power plant is identical to that of the aircraft.

4. *Catapult flexibility.*—One of the most interesting advantages of the jet powered catapult is the flexibility of the capacity of the catapult. For instance, if a requirement should occur to catapult an airplane to twice the desired kinetic energy, it would be relatively easy to use the same thrust and to increase the accelerated run by utilizing additional track and cable.

5. *Reciprocal launching.*—Inspection of the design will show that by using a shuttle for each cable (two cables) reciprocal launching can be used with no change to the equipment itself.

6. *No airplane modification.*—Preliminary investigation indicates that no modification to the airplane for catapult operation is required. No catapult hooks are required, because the thrust load is applied to the nose wheel assembly through the use of a specially designed catapult shuttle.

7. *Mobility and low installation time.*—It is estimated that the developed system in expeditionary form would require 36 hours using semi-skilled personnel to completely install the present novel system ready for operation.

Without further description, it is believed that the several embodiments and their advantages over the prior art are described and illustrated so as to be clearly understandable and it is to be expressly understood that other arrangements, parts and combinations of parts which will now occur to others are also to be considered within the scope of the present invention. To determine the scope of this invention, reference should be had to the appended claims.

What is claimed is:

1. A mobile power unit for multiple aircraft launching systems having oppositely rotatable turbines each respectively comprising an elongated sectional chassis, a first section of said chassis supporting a first jet engine having a plurality of jet exhaust ducts and a first turbine having a plurality of vanes adjacent the tail ends of said ducts and a drive shaft, a second section of said chassis supporting a similar second jet engine and a second turbine having a plurality of vanes adjacent the tail ends of the said ducts of the second jet engine, said second turbine having a drive shaft, a reversible power take-off means operatively connected to each one of the said drive shafts of said turbines, and connecting drive means between said power take-off means of each respective drive shaft.

2. A mobile power unit for multiple aircraft launching systems comprising an elongated sectional chassis, a first section of said chassis supporting a first jet engine having a plurality of jet exhaust ducts and a first turbine having a plurality of vanes adjacent the tail ends of said ducts, a second section of said chassis supporting a similar second jet engine and a second turbine, a power take-off means operatively connected to each one of the said turbines of said first and second jet engines, and separate brake means for holding or releasing each of said turbines for rotation by power transmitted thereto from either of said engines.

3. The mobile power unit for multiple aircraft launching systems defined in claim 2, wherein said first and second jet engines are reversely positioned on their respective chassis sections, whereby said first and second turbines are positioned adjacent each other for rotation in opposite directions when said brake means are alternately applied to on-off or off-on positions.

4. A looped cable launching system for aircraft, a track for each loop of the cable, an aircraft shuttle means comprising a body movable over the track when connected to the cable, cable clamp means engageable with the said shuttle body, clamp closing means adapted to clamp said clamp around the cable and clamp opening means adapted to unclamp said clamp means from the cable, said clamp means comprising an elongated carrier housing slidably mounted around the cable between guide rails of the track, bearing means coupled in each end of the housing in slidable contact with the cable, an annular groove in the interior wall of the housing at each end, a coupling ring in each of the respective grooves, said rings serving to couple together concentric yieldably deformable tubes around the cable, an expansible pad at each end of the housing folded around the said yieldably deformable tubes, said pads being expansible to thereby compress the tubes tightly around the cable.

5. In an aircraft launching system having a cable, an adjacent track and shuttle, a cable clamp unit comprising inflatable means connected in a fluid system, means adapted to inflate said first named means, cable clamping means encircling said cable, said first named means being folded around said cable clamping means adapted to move said clamping means into cable clamping position when inflated and adapted to permit said cable to travel freely through said clamping means while said first named means is deflated.

6. In an aircraft launching system having a cable, an adjacent track and shuttle, a cable clamp unit comprising inflatable means connected in a fluid system, means adapted to inflate said first named means, cable clamping means encircling said cable, said first named means being folded around said cable clamping means adapted to move said clamping means into cable clamping position when inflated and adapted to permit said cable to travel freely through said clamping means while said first named means is deflated, said inflating means comprising a shuttle drive block and a cylinder therein loaded with fluid, a piston in the cylinder having an extended piston rod, said cylinder being connected by conduit means to the interior of said inflatable means whereby when said extended piston rod is pushed partially into said cylinder when engaged by a loaded shuttle, the said inflatable means is inflated.

7. In an aircraft launching system having a cable, an adjacent track and shuttle, a cable clamp unit comprising inflatable means connected in a fluid system, means adapted to inflate said first named means, cable clamping means encircling said cable, said first named means being folded around said cable clamping means adapted to move said clamping means into cable clamping position when inflated and adapted to permit said cable to travel freely through said clamping means while said first named means is deflated, said inflating means comprising a shuttle drive block and a cylinder therein loaded with fluid, a piston in the cylinder having an extended piston rod, said cylinder being connected by conduit means to the interior of said inflatable means whereby when said extended piston rod is pushed partially into said cylinder when engaged by a loaded shuttle, the said inflatable means is inflated, and resistance means in said cylinder adapted to return said piston and said piston rod extension to deflating position when disengaged from said loaded shuttle.

8. An aircraft launching apparatus comprising an endless cable reeved around sheaves at each end thereof, a track adjacent said cable throughout the length thereof, said track having guide rails, a jet engine drive for said cable, brake means for said engine, an aircraft launching shuttle slidably mounted on said track, brake shoes mounted on each side of the shuttle, means adapted to clamp said shuttle to said cable, said means being slidable on guide means mounted between the guide rails, brake shoes mounted on the clamp means, said clamp means including a drive block, a piston and cylinder in said drive block, said cylinder being filled with fluid and said piston having a piston rod extending from the said block, clamp feeding means adjacent an end of said cable, said extended end of the said piston rod being retractable by the weight of the shuttle on the track when being forced there against by the said clamp feeding means, to thereby cause said clamp means to clamp around the cable and push the shuttle along the track, a brake adjacent said track engageable with the said brake shoes on said clamping means positioned to stop said clamp and thereby separate the same from said shuttle, and a second brake adjacent said track positioned to stop said shuttle at the terminal end of the track.

9. An aircraft launching apparatus comprising a straight track section having a launching end and a terminal end, and a plurality of alternately arranged switch track sections leading into the launching end of the straight track section, a plurality of shuttles adapted to travel over said track, an endless power driven cable adjacent said straight track section, a plurality of progressively fed cable clamps, and means for feeding said clamps forward one at a time into engagement with a respective shuttle on the straight track, said cable clamps when forced forward by said clamp feeding means engaging the tail end of the launching shuttle, and shuttle engaging means carried by the clamp serving to close said clamps around the launching cable when said means on the clamp engages the said shuttle.

10. An aircraft launching system of the cable catapult type comprising a track adjacent the cable having a starting end for positioning the launching mechanism in operative connection with the aircraft to be launched, said track at the starting end having an elevated shuttle starting section from the higher section, a storage space under said elevated section for slidably mounting a plurality of cable clamp means, and feed means for moving said clamp means forward from under said higher track section, said clamp means when moving under said lower track section having shuttle engaging means projecting upward above the track and engaging the tail of a shuttle as it moves down the ramp to said lower track section, whereby said clamp means is operated by said shuttle engaging means to clamp the cable and push the shuttle forward along the lower track section to launch an aircraft.

11. In an aircraft launching system having a looped power driven cable, elongated pits having side frame structures adjacent the cable, a track with guide rails carried by the pit side frames, said guide rails being adjacent the cable and a shuttle movable on the track, said shuttle comprising a structure extending above and below the guide rails of the track, said structure above the guide rails including a wheel cradle and said shuttle below the guide rails of the track comprising a bearing block formed with a longitudinal groove at the bottom thereof, a cable clamp, said cable clamp being connected to the said bearing block, said cable clamp comprising opposed jaw members, a jaw activator arm connected to each jaw member, said clamp activator arms extending outwardly in diverging directions into engagement with the said side walls of a respective track pit on each side of the said shuttle structure below the guide rails of the track, said opposite side wall structure of each pit being spaced closer together near the launching end of the track, said respective free ends of said activator arms of the shuttle clamp being in engagement with each respective opposite side wall structure of a respective pit, to thereby control the closing and opening of the clamp jaw members with respect to the cable, and means adapted to maintain said respective free ends of the said arms in engagement with each respective opposite side wall structure of said respective pit.

References Cited in the file of this patent

UNITED STATES PATENTS

| | | |
|---|---|---|
| Re. 24,201 | Addicks | Aug. 28, 1956 |
| 927,200 | Wick | July 6, 1909 |
| 1,415,847 | Sperry | May 9, 1922 |
| 2,432,177 | Sedille | Dec. 9, 1947 |
| 2,523,314 | Maxson et al. | Sept. 26, 1950 |

FOREIGN PATENTS

| | | |
|---|---|---|
| 522,767 | Great Britain | June 26, 1940 |

UNITED STATES PATENT OFFICE
CERTIFICATE OF CORRECTION

Patent No. 2,872,132                                                    February 3, 1959

Donald B. Doolittle

It is hereby certified that error appears in the printed specification of the above numbered patent requiring correction and that the said Letters Patent should read as corrected below.

Column 2, lines 40 and 41, strike out "Serial No. 436,281, assigned to the present assignee and now abandoned." and insert instead -- Serial No. 436,028, assigned to the present assignee and now Patent No. 2,789,780, issued April 23, 1957. --.

Signed and sealed this 19th day of May 1959.

(SEAL)
Attest:

KARL H. AXLINE                                                             ROBERT C. WATSON
Attesting Officer                                                Commissioner of Patents